United States Patent [19]

Baumann

[11] 4,370,424
[45] Jan. 25, 1983

[54] PLASTIC AND FOAM PLASTIC AND METHOD FOR MAKING THEM

[75] Inventor: Heinz Baumann, Kleinniedesheim, Fed. Rep. of Germany

[73] Assignee: Schaum-Chemie W. Bauer GmbH & Co KG, Essen, Fed. Rep. of Germany

[21] Appl. No.: 237,028

[22] Filed: Feb. 23, 1981

Related U.S. Application Data

[63] Continuation of Ser. No. 65,039, Aug. 9, 1979, abandoned.

[30] Foreign Application Priority Data

Aug. 9, 1978 [DE] Fed. Rep. of Germany ....... 2834794

[51] Int. Cl.³ ............................................. C08J 9/30
[52] U.S. Cl. .................................. 521/121; 521/136; 521/181
[58] Field of Search .................... 521/181, 121, 136

[56] References Cited

U.S. PATENT DOCUMENTS

| 3,150,108 | 9/1964 | Villi | 521/181 |
| 3,885,010 | 5/1975 | Bruning et al. | 521/181 |
| 4,176,216 | 11/1979 | Reid et al. | 521/181 |
| 4,221,871 | 9/1980 | Volodko et al. | 521/181 |

Primary Examiner—Morton Foelak
Attorney, Agent, or Firm—Sprung, Horn, Kramer & Woods

[57] ABSTRACT

Plastics are produced by reacting at least one compound containing sulfonic acid groups with at least one aldehyde in the presence of a hydroxy compound in an acidic concentrated aqueous solution having a water content of about 20 to 30% by weight. If a tenside is present the reactants will form a foam. The preferred sulfonic acid-containing compound is the sodium salt of diisobutylnaphthalene sulfonic acid, the preferred hydroxy compound is a phenol, vix. resorcinol, and the preferred aldehyde is formaldehyde which may be formed in situ from hexamethylenetetramine, paraformaldehyde, trioxane, or the like.

13 Claims, No Drawings

PLASTIC AND FOAM PLASTIC AND METHOD FOR MAKING THEM

This is a continuation of application Ser. No. 065,039, filed Aug. 9, 1979 now abandoned.

The present invention relates to new plastics and foam plastics and to methods for making the same.

Urea-formaldehyde-resin foam plastics (UF foam plastics), methods for making them and fields of application for the same are known from the literature and patents.

To make UF foam materials, a water-soluble tenside and a UF resin (UF condensation product) are required. The constitution of UF resins has still not been fully investigated.

Suitable tenside mixtures contain, besides the actual tenside in diluted solution, a hardener and a chemical substance to prevent mildewing in the final UF foam plastic, e.g. resorcinol. Compositions have been described in the literature.

As hardeners, preferably inorganic acids, particularly phosphoric acid, are used. As tenside, e.g. diisobutyl naphthalene sulfonic sodium, a water-soluble, anionic tenside, called DIBNS-Na, can be used. 40 ml of a commercial tenside mixture as suited for making foamed plastics consist of, for example, 13.83 g DIBNS-Na, 4.40 g resorcinol and 11.80 g of 85%-phosphoric acid in the form of a yellowish, highly viscous paste with ca. 24 to 30% water content (pH 10 to 12) or in the form of a dry substance as a light, hygroscopic powder (pH 7 to 11).

For making UF foam plastics, the tensides in the foam solution are strongly diluted with water. The ready-for-spraying solutions have a solid content of between 2 and 5%.

Earlier it was assumed that the tenside served only as a carrier for the UF resin (Plastverarbeiter 9 (1958) 453); later, however, it was believed that it might also react ionically with the reactive groups of the UF resin (Plastverarbeiter 27 (1976) 235).

The addition of other chemical substances to the basic solutions in order to improve the physical and chemical properties of the finished UF foam plastic has also long been known (Kunststoffe 47 (1957) 256).

Among many suggestions in the literature, amidosulfonic acid was proposed as a hardener and not as a tenside (Bachmann und Bertz, Aminoplast, VEB-Verlag für Grundstoff-Industrie, Leipzig 1969).

UF foam plastic, e.g. as thermal insulation material in two-sheet masonry, may frequently give off pungent formaldehyde fumes when drying out. Extensive tests were made for the purpose of finding ways to bind this free formaldehyde in any form whatsoever.

It was surprisingly found that under certain conditions compounds containing sulfonic groups and aldehydes in the presence of a hydroxy compound reacted quantitatively with one another, and that a new plastic material was formed thereby.

The method according to the invention for making this plastic is characterized in that:
(a) one or several compounds containing sulfonic groups in the presence of:
(b) a mono-, di- or polyhydroxy compound or mixtures thereof and
(c) possibly one or several inorganic or organic acids provided, when (a) is present in form of a salt, (c) must be present,
in the form of a concentrated aqueous solution with a water content of about 25 to 30%, as well as
(d) possibly other, customary additives and
(e) possibly other synthetic and natural resins are reacted with
(f) one or several saturated or unsaturated aldehydes or mixtures thereof or a compound which is able to form an aldehyde in acid medium,
under stirring, with or without addition of heat.

This was surprising particularly for the reason that though tenside mixtures that contained sulfonic acid and e.g. resorcinol as hydroxy compound had been used for many years in strongly diluted form in a foaming agent in the preparation of UF foam plastics no substantial reaction between the tenside and excess formaldehyde in the UF plastic had ever been observed.

It was further surprisingly found that according to the invention foam materials could be produced by foaming of only monomers according to the aforementioned components (a), (b), (f) and possibly (c), without requiring the presence of a finished resin product in the starting materials. Only after everything has been foamed is a resin formed from the monomers. The monomeric components (a), (b) and (c) as used for the preparation of the resin according to the invention are introduced into the resin tank in practically undiluted form, i.e. with a water content of 20 to 30%, and preferably 24%, and the same mixture, but in strongly diluted form as tenside together with the aldehyde into the pressure tank for the foaming agent solution, and then everything together foamed up.

The method according to the invention for making foam plastics is characterized in that:
(a) one or several compounds containing sulfonic groups in the presence of:
(b) a mono-, di- or polyhydroxy compound or mixtures thereof and
(c) possibly one or several inorganic or organic acids provided, when (a) is present in the form of a salt, (c) must be present,
in the form of a concentrated aqueous solution with a water content of 20 to 30%, as well as:
(d) possibly other, customary additives and
(e) possibly other synthetic and natural resins are foamed with
(f) one or several saturated or unsaturated aldehydes or mixtures thereof or a compound which is able to form an aldehyde in acid medium,
under addition of a tenside in a dilution as usually used for foam production of component (f) in a conventional foam making installation.

Numerous reactions between formaldehyde, other aldehydes, chemical compounds of an inorganic and organic nature are known; and also the production of synthetic resins. The most widely known are urea-, phenol-, resorcinol-, cresol- and xylol-formaldehyde resins. Further compounds were also prepared:

Huston and Eving prepared xylol-formaldehyde oligomeric aromates with formaldehyde in the presence of acids (Amer. Chem. Soc. (1915) 2394).

Formaldehyde-sulfuric acid is formed by the reaction of sulfur dioxide and formaldehyde (Reinking, Denehl and Labhard (Ber., 38 (1905) 1075).

Kalber obtained methylene-bis-derivatives from beta-naphthyl sulfonic acid and formaldehyde in aqueous solution (U.S. Pat. No. 2,056,924).

Phenol-formaldehyde-novolac (1 mol) can be sulfonated with hydrosulfuric acid (0.45 mol); also ligninsulfonic acids react with phenol-formaldehyde condensates (British Plastics (1949) 641).

Cohn describes a detection of formaldehyde up to 0.00005 mg by placing a layer of the same volume of a 0.1%-resorcinol solution over the solution to be analyzed and then adding slowly 2 ml of conc. sulfuric acid; in the presence of formaldehyde a violet-red zone will result (Chem.Ztg., 45 (1921) 997).

Ellis obtained slightly polyvalent phenolic resin products by reaction with formaldehyde, which are hard to isolate in the intermediate stage ("The Chemistry of Synthetic Resins", 277–395, Reinhold Publishing Corp., 1935, New York).

Fuler prepared methylol derivatives of hydroquinone with formaldehyde (Chem. Centr. (1941) I, 128–9) and CARO prepared methylene-bis-pyrogallol, the latter with formaldehyde in the presence of hydrochloric acid, at room temperature (Ber. 25 (1892) 941).

The new plastics not only yield foam plastics which give off practically no pungent formaldehyde or only for a relatively short period, but also have vis-a-vis UF plastics and UF foam plastics strongly improved stability to acids, alkalis and organic solvents, good temperature and flame resistance, as well as good mechanical and electrical properties. They, furthermore, can be produced at room temperature with simple stirring which results in low costs and energy savings.

The plastics according to the invention can be used in the production of fibers, injection moldings and thermal insulators.

The foam plastics made from these plastics find use as insulating and thermal insulating materials, in plastoponics, as oil absorbents, wound dressings, flower pinning materials, and in powder form as fillers, filter materials and pharmaceutical powders.

As compounds containing sulfonic groups there may be used sulfonic acids, sulfinic acids and sulfamidic acids and their salts either alone or mixed together.

Examples are arylalkyl sulfonates like alkyl benzene sulfonates and alkyl naphthalene sulfonates, which are used as important interface surface-active materials.

Naphtholsulfonic acids, naphthylaminesulfonic acids and aminonaphtholsulfonic acids and their sodium salts are known as readily available basic or intermediate products in dye manufacture. Anthraquinonesulfonic acid and its sodium salts are likewise intermediates in dye synthesis. A list of these compounds is given in "Römpps ChemieLexikon", 7.Ed., P. 2259.

Naphthalenesulfonic acids are known as mono-, di-, tri- and tetrasulfonic acids.

Heterocyclic sulfonic acids can be produced, for example, from acridine and acridone by means of chlorosulfonic acid.

Sulfamic acids are, for example, amidosulfuric acid, amidosulfonic acid or compounds to be denoted as sulfamidic acids.

A number of sulfonic acids that can be used according to the invention are given as follows: phenolsulfonic acids, alkylsulfuric acid and alkylsulfuric salts, alkylsulfonic chlorides, alkylsulfonic esters, alkylsulfonic acid and alkylsulfonic salts, paraaminobenzenesulfonic acids, aminonaphtholsulfonic acids, aminosulfonic acids, anilinsulfonic acids, anthraquinonesulfonic acids, arylsulfonic acids and their amides and chlorides, ethanesulfonic acid, ethylsulfuric acid, benzenedisulfonic acids, benzenesulfamic acid and benzenesulfinic acid, benzcatechinsulfonic acid, bromobenzenesulfonic acid, bromocamphorsulfonic acid, chlorosulfonic ester, diaminoanthraquinonedisulfinic acid, nitrobenzolsulfonic acid, nitronaphthalenesulfonic acid, nitroso-beta-naphthol-6-sulfonic acid, phenoldisulfonic acid, phenolsulfonic acid, phenylhydrazinesulfonic acid, phenylhydrazinesulfonic sodium, pyridinesulfonic acid, thiophenesulfonic acid, vinyl-sulfonic sodium salts, dinitro-oxynaphthalene-sulfonic acid, halogensulfonic acid, hydrazinesulfonic salts, indigosulfonic acid and indigodisulfonic acid, isododecylbenzenesulfonic sodium, perfluorosulfonic acid, bathocuproindisulfonic sodium salt and disodium salt, dimethylbenzenesulfonic acid, morpholino-ethanesulfonic acid, naphthoquinonesulfonic acid and salts and rarer sulfonic acids such as ferrospectral (III (II-pyrinyl)-V, VI-bis (IV-phenylsulfonic acid)-1,2,4-triacine-disodium salt).

Particularly preferred are aryl and alkylaryl sulfonic acids and their salts, and particularly diisobutylnaphthalenesulfonic sodium.

They can be used with success in both aqueous and nonaqueous solutions in relatively concentrated form.

Aldehydes to be used according to the invention are both saturated and unsaturated aliphatic and aromatic aldehydes as well as compounds that are able to form aldehydes in acid medium.

Suitable examples for aldehydes are formaldehyde, acetaldehyde, propionaldehyde, butyraldehyde, valeraldehyde, glutardialdehyde, pelargonaldehyde, furfurylaldehyde, crotonaldehyde, tiglicaldehyde, sorbicaldehyde, stearinaldehyde, malonaldehyde, myristicinaldehyde and pyridinaldehyde as well as glyoxal and mixtures thereof. An example of a compound which is able to form an aldehyde in acid medium is hexamethylenetetramine. They can be used in amounts of about 0.5 to 12 mol per mol sulfonic group-containing compound. Usually, the same are used in their commercially obtainable concentrations which may differ from one aldehyde to another. Especially preferred is a 35%-aqueous formaldehyde solution.

Phenols are particularly suited as hydroxy compounds. These phenols can be mono- or polyvalent, substituted or not substituted phenols such as phenol, resorcinol, brenzcatechin, hydroquinone and their tautomeric carbonyl forms; trihydroxybenzenes such as pyrogallol, hydroxyhydroquinone, polyhydroxybenzenes in their three possible forms (1,2,3,4-, 1,2,3,5- and 1,2,4,5-tetrahydroxybenzene); dihydroxytoluene, salicylic acid and gallic acid as well as mixtures thereof. They can be used in amounts of 0.1 to 5 mol per mol of compound containing sulfonic groups. Especially preferred is resorcinol.

When using compounds containing sulfonic groups in the free acid form the use of organic or inorganic acids as hardeners is not absolutely necessary, but has proved to be of a great advantage. When, on the other hand, the compounds containing sulfonic groups are used in the form of their salts then the use of an acid is necessary.

Acids suited according to the invention can be practically all inorganic and organic acids such as hydrochloric acid, sulfuric acid, phosphoric acid, nitric acid, oxalic acid and acetic acid. Especially preferred are phosphoric and sulfuric acids.

Usually, the acids are used in their commercial concentrations; however, the same can also be used in more diluted form.

The amounts to be used can be up to about 10 mol, relative to one mol of the compounds containing sulfonic groups.

The solutions of the starting compounds should be concentrated and contain only enough water or non-aqueous solvent to keep the products dissolved. 20 to 30% water have proved to be of particular advantage.

Other, usually used additions according to the invention are: fillers, dyestuffs, pigments, alcohols, inorganic or organic fibers, buffer substances, indicators, catalysts, regulators, emulsifiers, plasticizers, stabilizers, displacement reagents, deuterated compounds, metalloorganic compounds, metals and metal salts, alcoholates, phenolates, acetyl acetonates, solvents, hydrides, amides, heteroelement compounds, products for regulating the polymerization, polyaddition and polycondensation, radicals and radical initiators, cationic and anionic initiators, enzymes, vitamins, hormones, steroids, biochemicals, additives, flame retardants, crosslinking agents, expanding agents, UV stabilizers, antistatic conductive polymers or substances.

The same can be used alone or in mixture with one another, and in amounts up to about 50 mol per mol of compound containing sulfonic groups.

Also other known synthetic or natural resins or mixtures thereof can further be used before or during the condensation process. The said resins can be soluble or insoluble in water. Suitable resins are for example: resins based on aminoplasts, phenoplasts, desmodur, alpha-omega-urea resins or mixtures thereof, UF, PUR, PF resins, as well as styrene polymers, elastomer-modified copolymers, polyamides, polymethacrylates, polycarbonates, polytetrafluoroethylene and copolymers, basic substances for making polyacetals, aromatic polyethers, polyalkylene terephthalates, unsaturated polyester resins, silicone polymers, melamine resins and epoxide resins. The same can be used in amounts of up to 80 wt.-%.

The formation of the synthetic resins according to the invention takes place in most cases at room temperature without addition of heat, the temperatures rising at times up to 80° C. through exothermic reactions, depending on the kind of starting materials and additions used. With the more diluted solutions, however, external heating may be required or individual components may be preheated to a predetermined temperature so as to affect reaction times. To retard the reaction, individual substances or the entire solution may be cooled to 0° C. or diluted solutions may be used. The latter method is preferred where a particular mixture tends to explosionlike reactions. Usually, the reaction is effected at atmospheric pressure under simple stirring. However, the reaction can likewise be effected in vacuum or under pressure.

By varying the mole ratios of the starting materials within the aforementioned ranges, products with differing physical properties can be obtained such as sediments, precipitates, oligomers, lavalike products, slightly hardened products, viscous solutions, fibers or quantitatively hardened resins. The synthetic resins according to the invention can be hardened by radiation.

The transparent substances are of small crystalline structure, while the non-transparent substances are of an amorphous nature.

For a preliminary condensation, a small portion of the aldehyde to be used can be added to the reaction mixture, and the remainder added at some later time.

As already mentioned, foamed plastics can be produced from the plastics according to the invention, viz. soft (molded and bulk) foam, semirigid, rigid, structural and in situ foamed plastics.

Two processes are known in the manufacture of UF foam plastics. Besides the process described hereinbelow, so-called resin foaming is known. A resin and tenside in powder form are mixed together, dissolved in water before use, and the hardener added after the foaming.

The foams can be produced in situ or stationary, in pressure tanks or with pumps, or parts of the solutions from pressure tanks or conveyed by pumps can be fed to a foam spray gun (foam apparatus). Any desired pressure and any gas or compressed air as suited for foaming can be used.

All apparatuses described in the literature and patent literature can be used for the process according to the invention. It is of no consequence whether the solutions or solid additions are conveyed at an acute angle or at right angles, in parallel flow or in counterflow operation. What is important is that the reaction components are thoroughly mixed so that the necessary chemical reactions are initiated and a foam is produced.

It is also possible to produce foams from small handy spray cans in a one- or multichamber system.

A foam plastic could industrially be produced by using a tenside in place of a UF resin condensate and as foaming agent a similar tenside slightly diluted with water to which formaldehyde had already been added. Tenside concentrates foam very poorly or not at all. To achieve a foaming action, the concentrated tenside must be diluted with water. The degree of foaming can be readily and rationally determined from the foam spray gun in the Baumann-Graf apparatus. (Chemiker Zeitung, Chem. App. 90 (1966) 449).

A concentrated tenside can also be diluted with another sulfonic acid as a dilute or saturated aqueous solution. As a result, the reaction time of resin formation can be shortened.

The examples that follow serve for a further explanation of the invention.

EXAMPLE 1

400 ml of an aqueous mixture of 138.3 g DIBNS-Na, 44 g resorcinol and 118 g of 85%-phosphoric acid with a water content of about 24% were mixed with 40 ml of 35%-formaldehyde and stirred with a glass rod, the temperature rising thereat from 22° C. to 42° C. The dark-brown solution changed its color and first turned light-brown. It then became solid after a few seconds, spontaneously turning red during that time.

A sample of this synthetic resin of 480 g was dried in an oven at 105° C. for one hour. Following that, the sample weighed 431.5 g. After two years of storing at room temperature, the weight dropped to 320 g. After five years, the weight was still the same. The weight loss of 33.33% roughly corresponds to the amount of water of the starting solution. The substance did not change over the entire period.

EXAMPLE 2

10 g of the resin from Example 1 were pulverized, mixed with 100 ml of a 10%-sodium hydroxide solution, and stirred for 15 hours; the mixture was then filtered.

A slightly brownish, needle-shaped substance precipitated from the filtrate which was washed with methanol, acidified with sulfuric acid, and shaken out with ether. After evaporation of the ether, no residue remained.

The precipitate of the resin treated with sodium hydroxide solution gave a yield of 94% after drying at 115° C. This shows that the reactants had combined almost quantitatively.

EXAMPLE 3

10 g DIBNS-Na were acidified with sulfuric acid and shaken out with ether. The diisobutylnaphthalenesulfonic acid went over to the ether and remained after evaporation of the ether. Since, in contrast to the above, no diisobutylnaphthalene sulfonic sodium was found to exist in Example 2 it shows that the sulfonic acid in Example 2 is incorporated in the molecule.

EXAMPLES 4 through 23

In the examples that follow, differing amounts in formaldehyde were tested.

TABLE I

Differing amounts of formaldehyde added to a 40 ml basic solution (BS) consisting of: 13.83 g diisobutylnaphthalene sulfonic sodium 4.40 g resorcin, 11.80 g (85%-) phosphoric acid in aqueous solution (water content ca. 24%) - In all examples, the formaldehyde was added with stirring

| Example No. | 35%-formaldehyde, ml | Starting temperature, °C. | Max. temp. °C. | Reaction time sec. | Color state |
|---|---|---|---|---|---|
| 4 | 1 | 28 | 30 | no noticeable reaction | |
| 5 | 2 | 28 | 45 | striation | |
| 6 | 3 | 28 | 40 | striation | |
| 7 | 4 | 24.5 | 55.5 | 48 | pink, solid |
| 8 | 5 | 24.5 | 57 | 48 | pink, solid |
| 9 | 6 | 24.5 | 57 | 48 | pink, solid |
| 10 | 7 | 24.5 | 59.5 | 48 | pink, solid |
| 11 | 8 | 24.5 | 58 | 48 | pink, solid |
| 12 | 9 | 27.5 | 59.5 | 30 | pink, solid |
| 13 | 10 | 27.5 | 56 | 48 | pink, solid |
| 14 | 11 | 23.5 | 52 | 45 | pink, solid |
| 15 | 12 | 23.5 | 50.5 | 45 | pink, solid |
| 16 | 13 | 23.5 | 51 | 60 | pink, solid |
| 17 | 14 | 23.5 | 49 | 75 | pink, solid |
| 18 | 15 | 23.5 | 48 | 75 | pink, solid |
| 19 | 16 | 23.5 | 49 | 75 | pink, solid |
| 20 | 17 | 23.5 | 48 | 90 | pink, solid |
| 21 | 18 | 24 | 50 | 90 | pink, solid |
| 22 | 20 | 24 | 48 | 95 | pink, solid |
| 23 | 25 | 24 | 48 | 120 | pink, solid |

| | Weight of resins from the reactions using differing amounts of formaldehyde | | |
|---|---|---|---|
| Example | Weight 12 days after reaction | 30 days after reaction | 8 months after reaction |
| 4 | 40.77 | cannot be weighed | |
| 5 | 41.85 | " | |
| 6 | 42.93 | " | |
| 7 | 44.01 | 40.10 | 38.15 |
| 8 | 45.09 | 40.30 | 31.90 |
| 9 | 46.17 | 40.40 | 32.20 |
| 10 | 47.25 | 42.24 | 33.55 |
| 11 | 48.33 | 41.72 | 32.53 |
| 12 | 49.41 | 40.00 | 32.25 |
| 13 | 50.49 | 41.12 | 32.48 |
| 14 | 51.57 | 41.91 | 32.45 |
| 15 | 52.65 | 42.25 | 33.24 |
| 16 | 53.75 | 42.81 | 33.65 |
| 17 | 54.81 | 42.21 | 33.00 |
| 18 | 55.89 | 44.26 | 33.18 |
| 19 | | 43.88 | 32.90 |
| 20 | | 44.20 | 33.20 |
| 21 | | 43.86 | 33.08 |
| 22 | | not measured | 33.10 |
| 23 | | " | 33.88 |

In the following examples, various starting materials, molar ratios, temperatures and addition of other compounds as well as the production of foam materials were demonstrated.

EXAMPLE 24

1 mol diisobutylnaphthalene sulfonic sodium +0.6 mol resorcinol +2.4 mols phosphoric acid were mixed in concentrated aqueous solution with 0.7 mol hexamethylene tetramine and heated with stirring. At 50° C., at sticky, light-brown, coherent substance was obtained which, after filtering, did not dissolve in water, sulfuric acid, toluene and hydrochloric acid. It turned yellow in ethanol, red in soda lye. The substance could again be precipitated from the soda lye with hydrochloric acid. In nitric acid the substance turned yellow, and was soluble in n-butanol and dimethylformamide. Also from these solutions, the substance could be recovered with hydrochloric acid. Phosphoric acid hardened the solid substance still further.

EXAMPLE 25

1 mol diisobutylnaphthalene sulfonic sodium +0.6 mol resorcinol, 2.6 mols phosphoric acid and 1.6 mols urea were mixed in concentrated aqueous solution with 2.11 mols formaldehyde.

At 50° C., under stirring, a coherent lavalike resin precipitated, a few milliliters of a greenish solution remained. The solid substance was insoluble in cold soda lye and dimethylformamide. In hot soda lye, it turned bloodred, in dimethylformamide ocher.

The greenish solution did not react with soda lye, hydrochloric acid, n-butanol, cyclohexane and furfural.

EXAMPLE 26

1 mol diisobutylnaphthalene sulfonic sodium was dissolved in water and mixed with 0.6 mol resorcin, 2.4 mols phosphoric acid, 1.6 mols urea and 1.1 mols oxalic acid and heated. At 45° C., 0.7 mol hexamethylene tetramine was added. A lavalike resin as in Example 25 formed; however, the remaining solution was yellow-brown. It was dried in an oven. At 105° C., its volume increased about three-fold.

The filtered resin was boiled in soda lye, and after cooling, precipitated with hydrochloric acid, filtered and washed out. One part of the purified substance was mixed with a solution of soda lye and copper sulfate, a second part was mixed with a solution of ammonium hydroxide and iron-III-chloride. The corresponding salts were obtained in good yield.

EXAMPLE 27

1 mol diisobutylnaphthalene sulfonic sodium was dissolved in 5 mols water and heated to 60° C. This solution was then mixed with 20.5 mol resorcinol and 2 mols formaldehyde. No reaction took place; only after addition of 4 mols phosphoric acid did a red colored substance result.

This example demonstrates that an acid, phosphoric acid in this case, must be added to split off the sodium in the sulfonic acid so that a reaction can take place. The acid is required as an activator as well as a curing catalyst.

EXAMPLE 28

1 mol diisobutylnaphthalene sulfonic sodium was dissolved in 5 mols water and 2 mols formaldehyde and 4 mols phosphoric acid added thereto. The mixture was then heated to 60° C. Here too, no reaction took place. Only upon the addition of 0.5 mols resorcinol did a red resin form.

It can be inferred from this example that a hydroxy compound, resorcinol in this case, is required as the crosslinker of the reaction.

EXAMPLE 29

1 mol diisobutylnaphthalene-disulfonic acid was mixed with 10 mol water, 2.14 mol formaldehyde, 1.23 mols resorcin and 4.58 mols phosphoric acid. On heating, the solution reacted, and a precipitate formed. The latter was filtered off and washed with water until the aqueous solution was neutral. The precipitate was rubberlike and of a dark-brown color. It could not be pressed out on a clay plate. The large volume disintergrated after standing in air for 19 days.

EXAMPLE 30

1 mol diisobutylnaphthalenesulfonic sodium was mixed with 0.6 mol resorcinol and 2.4 mols phosphoric acid in 13 mols water and 0.6 mol formaldehyde added thereto.

The initially brown solution became lighter at 35° C., and thickened at 48° C., but was still stirrable at 80° C. It could not be filtered after cooling, but could be pressed on a clay plate. It did not change when drying at 105° C.

EXAMPLE 31

0.9 mol diisobutylnaphthalene sulfonic sodium, 1.8 mols resorcinol, 0.9 mol hydrochinone, 0.03 mol tin chloride as catalyst, and 8.5 mols phosphoric acid were dissolved in 50 mols water and mixed with 4.8 mols formaldehyde. On heating, a resin precipitated at 50° C.

EXAMPLE 31a

Foam production:

1 l of a commercial tenside consisting of 0.34 g DIBNS-Na, 0.11 g resorcinol and 0.295 g 85%-phosphoric acid in about 24% aqueous solution was introduced into the resin tank of an apparatus used for UF foam plastic production. 1 l of the same tenside which was diluted with 250 cc water and to which 80 cc 35% formaldehyde had been added was introduced into the pressure tank for the foaming agent solution. The whole was then foamed with nozzles used for UF foam plastic production, viz. a 2 mm resin nozzle and 1.5 mm foam nozzle, and with compressed air at 4.5 bars. From the hose connected with the spray gun a slightly yellowish foam emerged which did not collapse. Within 8 minutes, the temperature in the foam rose from 23.5° to 32.5° C. At the start of the reaction, the foam turned reddish. In the course of the reaction, the color turned a deep red. The resultant foam was flexible and resilient, could be dried at 120° C. without any change and under color intensification. Its weight per cubic meter was about 40 kg.

The foam was of open pore structure, individual cells being occasionally covered over with resin films, as they appear in a 30 kg UF foam. The foam was hydrophilic.

| | Solution tests | after 24 hours | boiled |
|---|---|---|---|
| 1. | 95%-sulfuric acid | dissolved | — |
| (1a) | 40%-sulfuric acid | no change | no change |
| 2. | 37%-fuming hydrochloric acid | no change | no change |
| 3. | 85%-phosphoric acid | no change | color intensification |
| 4. | 65%-nitric acid | dissolved | — |
| (4a) | 25%-nitric acid | dissolved | — |
| 5. | 96%-acetic acid | no change | no change |
| 6. | Absolute alcohol | no change; substance turns yellow | no change |
| 7. | Acetone | no change substance turns yellow | no change |
| 8. | Dimethylformamide | no change | no change |
| 9. | Dioxane | no change substance turns yellow | no change |
| 10. | Paraffin oil | no change | no change |
| (10a) | Motor oil | no destruction | — |
| 11. | 20%-soda lye | no change | no change |
| 12. | Water | no change (the pH value both before and after boiling was 2.5) | no change |

The melting point of the foam is about 200° C. The foam chars in the flame at about 300° C. without dripping.

TABLE II

| | | | | Starting temperature °C. | Max. temperature °C. | Reaction time sec. |
|---|---|---|---|---|---|---|
| No. | BS | Aldehyde | Hardener | | | |
| 31b | BS | 4 ml formaldehyde | 4 ml H$_3$PO$_4$ | 30 | 50 | 48 |
| 32 | | 2 ml formaldehyde | 2 ml H$_3$PO$_4$ | 20 | 60 | |
| 33 | BS | 6 ml formaldehyde | | 24 | 40 | 40 |
| 34 | | 6 ml formaldehyde | | | | |
| 35 | BS | 5 ml furfurylaldehyde (95%) | | | | |
| 36 | | 4 ml formaldehyde | | 23 | 70 | 48 |
| 37 | | 6 ml formaldehyde | | 23 | 30 | |
| 38 | | 7 ml formaldehyde | | 23 | 29 | |
| 39 | | 7 ml formaldehyde | | 22.5 | 36 | |
| 40 | BS | 7 ml formaldehyde | | 22.5 | 75 | |
| 41 | BS | 7 ml formaldehyde | | 22.5 | 75 | |
| 42 | BS | 9 ml acetaldehyde | | | | |
| 43 | BS | 9 ml propionaldehyde | | | | |
| 44 | BS | 9 ml butyraldehyde | | | | |
| 45 | BS | 7 ml formaldehyde | | 23 | 75 | |
| 46 | BS | 7 ml valeraldehyde | | | | |
| 47 | BS | 7 ml formaldehyde | | 24 | 42 | |

| No. | Sulfonic acid and/or hydroxy compound in aqueous solution | Other substances | Remarks |
|---|---|---|---|

TABLE II-continued

In all examples the aldehyde was added under stirring

| No. | Sulfonic acid / hydroxy compound | Other substances | Remarks |
|---|---|---|---|
| 31b | | | pink, solid |
| 32 | 3.4 anthraquinone-2-sulfonic sodium + 1 g resorcinol | | red, solid |
| 33 | | 2 ml iron-II-chloride solution | red, solid |
| 34 | 5 g p-toluenesulfonic acid + 1 g resorcinol | | pink |
| 35 | | | black, solid |
| 36 | 10 g p-toluenesulfonic acid + 4.8 g resorcinol | | red, solid |
| 37 | 10 g diisobutylnaphthalene-di-sulfonic sodium + 3.5 g resorcinol | 10 ml iron-III-chloride | brown, solid |
| 38 | 20 g as in 37 + 1.4 g resorcinol | 1.4 g tannic acid | brown, solid |
| 39 | 15 g benzenesulfonic acid + 1.4 g resorcinol | | light red, solid |
| 40 | 1.4 g pyrocatechol | | red, soft |
| 41 | 1.4 g phloroglucinol | | red, soft |
| 42 | | | greasy brown substance, which becomes solid after some time |
| 43 | | | brown substance, hardens with prolonged exposure |
| 44 | | | brown substance, hardens with prolonged exposure |
| 45 | 1.4 g hydroquinone | | brown, soft |
| 46 | | | brown substance, hardens with prolonged exposure |
| 47 | 20 g diisobutylnaphthalene-disulfonic disodium + 4.2 g resorcinol | | brown, solid |

TABLE III

| No. | BS | Aldehyde | Hardener | Starting temp. °C. | Max. temp. °C. | Reaction time sec. |
|---|---|---|---|---|---|---|
| 48 | | 7 ml formaldehyde | | 23.5 | 52 | |
| 49 | | 7 ml formaldehyde | 40 ml 98%-sulfuric acid | | | |
| 50 | BS | 8 ml formaldehyde | | 18 | 45 | 120 |
| 51 | BS | 7 ml formaldehyde | | 20 | 40 | 240 |
| 52 | BS | 4 ml formaldehyde | | 20 | 43 | 80 |
| 53 | BS | 4 ml formaldehyde | | 18 | 38 | |
| 54 | BS | 4 ml formaldehyde | | 24 | | 120 |
| 55 | BS | | | 24 | 41 | 110 |

| No. | Sulfonic acid and/or hydroxy-compound in aqueous solution | Other substances | Remarks |
|---|---|---|---|
| 48 | as in example 37 + 5.4 g resorcinol | | brown, solid |
| 49 | + 5 g resorcinol | | red, solid |
| 50 | + 2.8 g resorcinol | | red, solid |
| 51 | 3 g sulfanilic acid + 2 g resorcinol | | brown, soft |
| 52 | | 1.4 g ammonium chloro-cuprate II | red, solid |
| 53 | 1 g sulfanilic acid | | red, semirigid |
| 54 | | 40 ml water | red, solid |
| 55 | | 40 ml water | red, solid |

TABLE IV

| No. | BS | Aldehyde | Hardener | Starting temp. °C. | Max. temp. °C. | Reaction time seconds |
|---|---|---|---|---|---|---|
| 56 | BS | 7 ml formaldehyde | | 22 | 30 | 30 |
| 57 | BS | 4 ml formaldehyde | | 18 | 27 | 127 |
| 58 | BS | 4 ml formaldehyde | | 20 | 38 | 240 |
| 59 | BS | 4 ml formaldehyde | | 20 | 41 | 300 |
| 60 | BS | 7 ml pyridinaldehyde | | 18 | 40 | 60 |
| 61 | BS | 4 ml pyridinaldehyde | | 18 | 40 | 80 |
| 62 | | 2 ml formaldehyde | 18.7 ml phosphoric acid | 26 | 35 | 45 |
| 63 | | 7 ml formaldehyde | 11.8 ml phosphoric | 26 | 38 | 220 |

TABLE IV-continued

| No. | BS | Aldehyde | Hardener | Starting temp. °C. | Max. temp. °C. | Reaction time seconds |
|---|---|---|---|---|---|---|
| 64 | | 7 ml glutardialdehyde (25%-) | 6 ml phosphoric acid | 26 | 40 | 70 |
| 65 | | 7 ml formaldehyde | 11.8 ml phosphoric acid | 28 | 41 | 68 |
| 66 | | 7 ml formaldehyde | 11.8 ml phosphoric acid | 28 | 40 | 60 |
| 67 | BS | 7 ml pelargonaldehyde | | 21 | 35 | 80 |
| 68 | BS | 3.5 ml formaldehyde + 3.5 ml pelargonaldehyde | | 21 | 40 | 80 |

| No. | Sulfonic acid and/or hydroxy compound in aqueous solution | Other substances | Remarks |
|---|---|---|---|
| 56 | Mixture of diisobutylnaphthalene di-and-trisulfonic acid + 1.4 g resorcinol | 1.4 g tannic acid | black, solid |
| 57 | | 1 g tannic acid + 4 ml water | brown, solid |
| 58 | | 3 ml ethanol | brown, solid |
| 59 | | 1 g 2-amino-diphenyl-amine in 8 ml ethanol | yellow substance, solid, after 1 hour recoloration |
| 60 | | | soft, hardens after 12 hours |
| 61 | | | red, solid |
| 62 | 40 ml of a solution of 282.19 g benzenedisulfonic (1,3)-disodium in 500 ml water and 3.52 resorcinol | | milky, solid |
| 63 | as example 62 | | pink, solid |
| 64 | 40 ml saturated aqueous solution of diisobutylnaphthalenesulfonic-Na + 3 g resorcin | | turns pink and solid at 60° C. |
| 65 | as example 64 and 3 g orcinol | | yellow substance, solid |
| 66 | 13.8 g dodecylbenzenesulfonic sodium + 3 g resorcinol | 18 ml water | light pink, solid |
| 67 | | | light brown, draws threads |
| 68 | | | red, solid |

TABLE V

| No. | BS | Aldehyde | Hardener | Starting temp. °C. | Max. temp. °C. | Reaction time seconds |
|---|---|---|---|---|---|---|
| 69 | BS | 7 ml propionaldehyde | | 22 | 40 | 60 |
| 70 | BS | 4 ml propionaldehyde | | 22 | 40 | 65 |
| 71 | BS | 7 ml butyraldehyde | | 22 | 40 | 60 |
| 72 | BS | 4 ml butyraldehyde | | 22 | 40 | 60 |
| 73 | BS | 4 ml valeraldehyde | | 22 | 40 | 60 |
| 74 | BS | 14 ml formaldehyde | | 22 | 44 | 50 |
| 75 | BS | 7 ml formaldehyde + 7 ml butyraldehyde | | 20 | 44 | 55 |

| No. | Sulfonic acid and/or hydroxy compound in aqueous solution | Other substances | Remarks |
|---|---|---|---|
| 69 | | | darkbrown, soft |
| 70 | | | red, solid |
| 71 | | | darkbrown, soft |
| 72 | | | brown, solid |
| 73 | | | brown, solid |
| 74 | + 4 ml of a saturated p-toluene sulfonic acid | | raspberry colored, solid |
| 75 | as Example 74 | | deep red (jellylike) solid |

TABLE VI

| No. | BS | Aldehyde | Hardener | Starting temp. °C. | Max. temp. °C. | Reaction time seconds |
|---|---|---|---|---|---|---|
| 76 | | 7 ml formaldehyde | 11.8 g phosphoric acid | 22 | 40 | 67 |
| 77 | 44 ml BS | 5 ml formaldehyde | — | 28 | 29 | 65 |
| 78 | | 5 ml formaldehyde | 5 ml sulfuric acid | | | |
| 79 | | 1.5 g paraformaldehyde | 5 ml sulfuric acid | | | |
| 80 | | 7 ml formaldehyde | 2.5 ml phosphoric and 0.4 ml sulfuric acid | | | |

TABLE VI-continued

| | | | | | |
|---|---|---|---|---|---|
| 81 | | 1 ml formaldehyde | 1 ml phosphoric acid | 22 | 35 | |
| 82 | BS | 7 ml formaldehyde | | 18 | 39 | |
| 83 | | 6 ml formaldehyde | | | | 245 |

| No. | Sulfonic acid and/or hydroxy compound | Other substances | Remarks |
|---|---|---|---|
| 76 | 13.8 g commercial dodecyl-benzenesulfonic acid-Na and 3 g resorcinol in 18 ml water | | Lightred substance. quantitatively solid |
| 77 | | 3 ml monostyrene 2 ml ethanol | light brown, solid substance |
| 78 | 13 g indigocarmine with 3 g resorcinol in 20 ml water | | semisoft beige substance |
| 79 | 3 g solid DIBNS powder and 1 g resorcinol dissolved in 20 ml glacial acetic acid | | oligomers are formed |
| 80 | 40 ml of a saturated solution of DIBNS powder and 5 g salicylic acid | | no immediate reaction, after hours the substance becomes quantitatively solid. It is of a green color. At 120° C., it turns into a dirty yellow |
| 81 | 0.5 g o-sulfanilic acid is dissolved in water and mixed with 0.4 g resorcinol | | Solution turns red and becomes solid |
| 82 | | 3 g ammonium phosphate | A ball of threads is formed under continuous stirring. Color: light-red. Yield 24 g |
| 83 | 40 ml diisobutylnaphthalene-disulfonic acid concentrate are mixed with 1.4 g resorcinol | | No immediate reaction. If after 8 hours a further 1.4 g resorcinol are added a fibrous substance is obtained after 15 min. stirring which does not change at 105° C., it is dark brown, turns red in soda lye |

TABLE VII

| No. | Aldehyde | Hardener | Starting temp. °C. | Max. temp. °C. | Reaction time sec. |
|---|---|---|---|---|---|
| 84 | 5 ml formaldehyde | 5 ml phosphoric acid | | 70° | |
| 85 | 4 ml formaldehyde | | | | |
| 86 | 7 ml formaldehyde | 3 ml phosphoric acid | | | |
| 87 | 2 ml formaldehyde | 10 ml 95%-sulfuric acid | | | |
| 88 | 7 ml formaldehyde | 4 ml phosphoric acid | | | |
| 89 | 1 ml formaldehyde | 1 ml phosphoric acid | | | |
| 90 | 7 ml formaldehyde | 2 ml sulfuric acid | | | |

| No. | Sulfonic acid and/or hydroxy compound | Other substances | Remarks |
|---|---|---|---|
| 84 | 10 g anthraquinone-2-sulfonic sodium salt in 100 ml water + 4 g resorcinol | | Hardener and formaldehyde are added together at the end, then heated. At about 90° C. explosionlike solidification takes place. |
| 85 | 40 ml diisobutylnaphthalene-disulfonic acid + 14 g resorcinol | | upon stirring, a substance in form of a ball of threads is formed |
| 86 | 30 g sulfanilic acid + 2.8 g resorcinol in aqueous solution | | A red resin is formed |
| 87 | 2.8 g resorcinol | | oligomers are formed under red coloration |
| 88 | 30 g benzenedisulfonic acid-(1,3) disodium salt + 1.4 g resorcinol | | oligomers |
| 89 | 5 g Na-salt of 4'-(dimethyl-amino)-azobenzene-4-sulfonic acid dissolved in boiling water + 0.5 g resorcinol | | oligomers are formed |
| 90 | 40 ml diisobutyl-disulfonic disodium salt + 1 g of phenol | | at 80–85° C. oligomers are formed which harden further |

TABLE VII-continued

|  |
|---|
| after cooling |

TABLE VIII

| No. | BS | Aldehyde | Hardener | Starting temp. °C. | Max. temp. °C. | Reaction time sec. |
|---|---|---|---|---|---|---|
| 91 |  | 7 ml formaldehyde | 1 ml phosphoric acid |  |  |  |
| 92 |  |  |  |  |  |  |
| 93 |  | 1.5 ml formaldehyde |  |  |  |  |
| 94 |  | 10 ml formaldehyde | 2 ml phosphoric acid | 20 | 40 |  |
| 95 |  | 10 ml formaldehyde |  | 22 | 48 | 60 |
| 96 |  | 7 ml formaldehyde |  | 26.5 | 62 |  |
| 97 |  | 0.35 ml formaldehyde | 3 ml sulfuric acid |  |  |  |
| 98 |  | 0.7 ml formaldehyde |  |  |  |  |

| No. | Sulfonic acid and/or hydroxy compound | Other substances | Remarks |
|---|---|---|---|
| 91 | 40 ml 5%-DIBNS-solution + 2.8 g resorcinol |  | Reaction takes place upon heating, at 90° the solution becomes quantitatively solid |
| 92 | as 91, but 4.2 g resorcinol |  | same result as example 91 |
| 93 | 20 ml of a saturated toluene-sulfonic acid solution + 9.93 g resorcinol |  | The temperature rises from 17 to 54° C. The solution turns wine yellow. With addition of 5 ml phosphoric acid, a resin is formed. |
| 94 | 40 ml of the solution from example 93 |  | A solid raspberry resin is formed. About 20 ml liquid could be decanted which was slightly yellow, but solidified with further addition of formaldehyde |
| 95 | 20 ml of a suspension of congo red in 95%-sulfuric acid are mixed with 6 g resorcinol and diluted to 60 ml |  | The blue color of the solution changes to brown red and becomes solid. Color does not change although pH value is still acid. |
| 96 | as Example 95, only 5 g resorcinol |  | The solution becomes solid under brownred coloration |
| 97 | 2 g benzenesulfinic sodium + 0.15 resorcinol |  | With careful heating, a pink resin is quantitatively formed |
| 98 | as Example 97 |  | On heating, the mixture reacts explosionlike. The solid substance is hurled 3 m away from reaction flask |

TABLE IX

| No. | | Aldehyde | Hardener | Starting temp. °C. | Max. temp. °C. | Reaction time seconds |
|---|---|---|---|---|---|---|
| 99 |  | 7 ml formaldehyde | 10 ml sulfuric acid |  |  |  |
| 100 |  | 7 ml formaldehyde | 10 ml 35%-hydrochloric acid |  |  |  |
| 101 |  | 7 ml formaldehyde | 10 ml phosphoric acid |  |  |  |
| 102 | BS | 5 ml formaldehyde |  | 22.8 | 43.3 | 60 |
| 103 |  | 9 ml formaldehyde | 3 ml phosphoric acid and 1 ml sulfuric acid |  |  |  |
| 104 |  | 5 ml formaldehyde | 10 ml phosphoric acid | 30 | 40 | 60 |
| 105 |  | 5 ml formaldehyde |  | 32 | 48 | 240 |

| No. | Sulfonic acid and/or hydroxy compound | Other substances | Remarks |
|---|---|---|---|
| 99 | 40 ml of a conc. solution of an alkanesulfonic acid-sodium salt with 1.75 g resorcinol |  | solution turns red, a deep-red precipitate is formed |
| 100 | as Example 99 |  | solution behaves as in Example 99 |
| 101 | as Example 99 |  | the mixture reacts immediately and becomes quantitatively solid |
| 102 | 40 ml without resorcinol + 1.0 g 3,5-dihydroxytoluene |  | a solid substance is formed |
| 103 | 40 ml of a saturated DIBNS solution + 5 salicylic acid |  | the solution solidifies after several hours standing quantitatively. The resin is of a green color. |

TABLE IX-continued

| No. | | | Remarks |
|---|---|---|---|
| 104 | 13.8 g dodecylbenzenesulfonic sodium + 5 g resorcinol in saturated aqueous solution | | After drying at 120° C. a yellowish discoloration takes place. resin, light pink, solution quantitatively solid |
| 105 | 40 ml of a solution from 0.4 mol DIBNS and 0.27 mol resorcinol and 0.83 mol phosphoric acid | | freshly prepared solution. Solution becomes viscous-hard, red and transparent |

TABLE X

| No. | BS | Aldehyde | Hardener | Starting temp. °C. | Max. temp. °C. | Reaction time seconds |
|---|---|---|---|---|---|---|
| 106 |    | 5 ml formaldehyde | | 25 | 43 | 90 |
| 107 | BS | 5 ml formaldehyde | | 27 | 46 | 45 |
| 108 | BS | 5 ml formaldehyde | | 26 | 30 | 110 |
| 109 | BS | 5 ml formaldehyde | | 26 | 53 | 120 |
| 111 | BS | 7 ml formaldehyde | | 23 | 46 | 75 |
| 110 | BS | 5 ml formaldehyde | | 24 | 76 | 180 |
| 112 | BS | 14 ml formaldehyde | | 23 | 44 | 73 |
| 113 | BS | 7 ml formaldehyde | | | | |

| No. | Sulfonic acid and/or hydroxy compound | Other substances | Remarks |
|---|---|---|---|
| 106 | as Example 105 | | substance solidifies quantitatively. Test lasted 18 days. According to mixture from Example 105 |
| 107 | 40 ml | 20 ml urea-formaldehyde-resin condensate | The UF resin was added at the start of the reaction when the solution became cloudy after 45″. The resin mixture is amorphous and hard as rock, almost no shrinkage after exposure for several weeks. |
| 108 | 40 ml | 10 ml phenolic resin (bakelite H 981) | With the addition of resin, the solution clears up again. After 2 minutes, a raspberry red resin is formed quantitatively. |
| 109 | 40 ml | 10 ml bakelite-resin (AF2580) | resin is amorphous, red and hard. |
| 111 | 40 ml | 10 ml desmodur 44 V | substance is hard and solid. |
| 110 | 40 ml | 10 ml furfurylalcohol | a green, slightly rubberlike resin is formed |
| 112 | 100 ml | 20 ml desmodur 44 V + 3 ml PU 1109 | solid, but gritty resin is formed |
| 113 | 25 ml | 10 ml desmodur 44 V + 1 ml glycerin 1 ml desmor 726 B 2 ml frigen | a foam is formed. 5-fold foaming. |

TABLE XI

| No. | GL | Aldehyde | Hardener | Starting temp. °C. | Max. temp. °C. | Reaction time seconds |
|---|---|---|---|---|---|---|
| 114 | | 2.33 mols formaldehyde | 4 mols phosphoric acid | 27 | 46 | 135 |
| 115 | | 4 mols formaldehyde | 4 mols phosphoric acid | 27 | 39 | 95 |
| 116 | | 2.33 mols formaldehyde | none | 25.5 | 36 | 300 |
| 117 | | 4 mols formaldehyde | 2 mols phosphoric acid | 26 | 40 | 65 |
| 118 | | 4 mols formaldehyde | 2 mols phosphoric acid | 27 | 39 | 80 |
| 119 | | 4 mols formaldehyde | none | 25 | 33 | 540 |
| 120 | | 5 mols formaldehyde | 5 mols phosphoric acid | 31 | 52 | 90 |
| 121 | | 3 mols formaldehyde | 6 mols phosphoric acid | 31 | 45.5 | 80 |

| No. | Sulfonic acid and/or hydroxy compound | Other substances | Remarks |
|---|---|---|---|
| 114 | 1 mol paratoluenesulfonic acid + 1 mol resorcinol in aqueous conc. solution | | quantitatively solid resin |
| 115 | as Example 114 | | quantitatively solid resin |
| 116 | as Example 114 | | as examples 114 a. 115 |

TABLE XI-continued

| | | | |
|---|---|---|---|
| 117 | as Example 114, only 0.45 mol resorcinol | | as example 116 |
| 118 | as Example 117 | | as example 116 |
| 119 | as Example 117 | | after 14.5 min, solid resin is formed |
| 120 | 1 mol naphthalenetrisulfonic trisodium salt + 3 mol resorcinol | UF resin | components do not solidify. If UF is added after 3 days (1 part UF resin per 3 parts of solution), the mixture solidifies only after 15 minutes in spite of ph 1 (one) The rapid reaction of UF resin can thus be delayed. |
| 121 | as Example 120 | 0.8 mol butanol | 2 resin types are precipitated. A coherent, fiber-like compound is soluble in NaOH and precipitates again with hydrochloric acid. It is yellow. |

TABLE XII

| No. | BS | Aldehyde | Hardener | Starting temp. °C. | Max. temp. °C. | Reaction time seconds |
|---|---|---|---|---|---|---|
| 122 | | 2 mol formaldehyde | 0.4 mol sulfuric acid | 27 | 46.5 | 17 |
| 123 | | 4 ml formaldehyde | 2.5 ml sulfuric acid | 28 | 41 | 25 |
| 124 | | 4 ml formaldehyde | 2.5 ml fuming hydrochloric acid | 23 | 35 | 55 |
| 125 | | 4 ml formaldehyde | 2.5 ml 65%-nitric acid | 24.5 | 40 | 45 |
| 126 | | 4 ml formaldehyde | 2.3 g oxalic acid | 22 | 23 | 60 |
| 127 | BS | | | 21.2 | 37.3 | 185 |
| 128 | BS | | | 21.4 | 33.6 | 140 |

| No. | Sulfonic acid and/or hydroxy compound | Other substances | Remarks |
|---|---|---|---|
| 122 | as Example 120, only 1 mol resorcinol | | a red colored resin immediately precipitates quantitatively |
| 123 | 3.1 g naphthalenetrisulfonic trisodium + 0.9 g resorcinol | | resin is formed immediately quantitatively |
| 124 | as Example 123 | | as example 123 |
| 125 | as 123 | | as example 123 |
| 126 | as 123 | | with addition of oxalic acid sodium oxalate precipitates. With addition of 3 ml acetic acid the solution quantitatively solidifies within 15 min. |
| 127 | 20 ml + (15 ml BS + 5 ml water + 5 ml formaldehyde) | | a resin is formed |
| 128 | 40 ml + (10 ml BS + 5 ml formaldehyde) | | a resin is formed. (The BS of this example is 3 weeks older than the BS of example 127). |

TABLE XIII

| No. | BS | Aldehyde | Hardener | Starting temp. °C. | Max. temp. °C. | Reaction time seconds |
|---|---|---|---|---|---|---|
| 129 | BS | | | 21.4 | 37 | 80 |
| 130 | BS | 3 ml formaldehyde | | 24.4 | 53.6 | 300 |
| 131 | BS | 4 ml formaldehyde | | 24.5 | 37 | 480 |
| 132 | BS | 4 ml crotonaldehyde | 3 cc H$_2$SO$_4$ | 24.5 | 40 | 50 |
| 133 | BS | 5 ml crotonaldehyde 1 ml formaldehyde | | 24.5 | 41 | 240 |
| 134 | BS | 7 ml glyoxalaldehyde | 3 cc H$_2$SO$_4$ | 24.5 | 40 | 40 |
| 135 | BS | 2 ml glyoxalaldehyde | | 22.0 | | 5 hours |
| 136 | BS | 4 ml formaldehyde | | 21.0 | 42 | 50 |

| No. | Sulfonic acid and/or hydroxy compound | Other substances | Remarks |
|---|---|---|---|
| 129 | as Example 128 | | as example 128 (the solution of this example is 4 months old). There is a clearly recognizable color difference between the formed resins of examples 128 |

TABLE XIII-continued

| | | |
|---|---|---|
| 130 40 ml, but without resorcinol + 5.62 g gallic acid dissolved in hot water | little ethanol 10 ml furfuryl alcohol | and 129. the solution becomes viscous at 48.2. The substance is soluble in NaOH and precipitates again with hydrochloric acid. After prolonged standing, the substance hardens further from above. The amorphous substance turns into a clear lightbrown compound. After 14 days, the fully hardened resin is no longer soluble in NaOH. It changes its color lengthwise, it turns red. The amorphous substance still soluble in NaOH no longer precipitates with addition of hydrochloric acid |
| 131 40 ml | | |
| 132 40 ml | | |
| 133 40 ml | | lightbrown, semirigid monomers |
| 134 40 ml | | |
| 135 40 ml | | separation of a green liquid, the formed resin is solid with a brown color |
| 136 40 ml | polystyrene pellets (15 g/l) | the pellets are firmly incorporated in the resin formed |

It will be appreciated that the instant specification and examples are set forth by way of illustration and not limitation, and that various modifications and changes may be made without departing from the spirit and scope of the present invention.

What is claimed is:

1. A method for making a plastic foam comprising intimately mixing a concentrated acidic aqueous solution of a phenol and a sulfonic acid, the concentrated solution having a water content of about 20 to 30% by weight, with a foamed solution of an aldehyde and a tenside, and permitting the foam to harden.

2. A method according to claim 1, wherein foaming and mixing are effected by supplying a compressed gas to the aldehyde solution to form a foam and mixing the foam intimately with the concentrated solution to effect reaction between the aldehyde and phenol.

3. A method according to claim 1, wherein a sulfonic acid is added in the form of a salt along with an acid.

4. A method according to claim 1, wherein the aldehyde is formed in situ by addition of a material which forms the aldehyde under the prevailing conditions.

5. A method according to claim 1, wherein per mol of sulfonic acid there are present about 0.1 to 5 mols of phenol, about 0.5 to 12 mols of aldehyde, and 0 to about 10 mols of an acid.

6. A method according to claim 1, wherein the sulfonic acid is a sulfonic acid, per se a sulfinic acid, a sulfamidic acid or a salt thereof.

7. A method according to claim 1, wherein the sulfonic acid is an aryl- or alkylarylsulfonic acid or a salt thereof.

8. A method according to claim 1, wherein the phenol is resorcinol.

9. A method according to claim 1, wherein the aldehyde is a saturated aliphatic aldehyde with up to about 9 carbon atoms.

10. A method according to claim 1, wherein the aldehyde is formaldehyde.

11. A method according to claim 1, wherein the solution is acidic by virtue of the presence of at least one of phosphoric acid, sulfuric acid or acetic acid.

12. A method according to claim 1, wherein per mol of sulfonic acid there are present about 0.1 to 5 mols of the phenol, about 0.5 to 12 mols of aldehyde, 0 to about 10 mols of an acid, and up to about 80 weight % based on total materials other than water of a resin selected from the group consisting of UF, PUR, PF resins, styrene polymers, elastomer-modified copolymers, polyamides, polymethacrylates, polycarbonates, polytetrafluoroethylene and copolymers, basic substances for making polyacetals, aromatic polyethers, polyalkylene terephthalates, unsaturated polyester resins, silicone polymers, melamine resins and epoxide resins.

13. A method according to claim 1, wherein per mol of sulfonic acid there are present up to about 50 mols of at least one additive selected from the group consisting of fillers, dyestuffs, pigments, alcohols, inorganic or organic fibers, buffer substances, indicators, catalysts, regulators, emulsifiers, plasticizers, stabilizers, displacement reagents, deuterated compounds, metal organic compounds, metals and metal salts, alcoholates, phenolates, acetyl acetonates, solvents, hydrides, amides, heteroelement compounds, products for regulating the polymerization, polyaddition and polycondensation, radicals and radical initiators, cationic and anionic initiators, enzymes, vitamins, hormones, steroids, biochemicals, additives, flame retardants, cross-linking agents, expanding agents, UV stabilizers, and antistatic conductive polymers.

* * * * *